(12) United States Patent
Kumar

(10) Patent No.: US 9,952,807 B1
(45) Date of Patent: Apr. 24, 2018

(54) VIRTUAL MACHINE BACK-UP

(75) Inventor: Sunil Kumar, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 541 days.

(21) Appl. No.: 13/174,305

(22) Filed: Jun. 30, 2011

(51) Int. Cl.
*G06F 12/00* (2006.01)
*G06F 3/06* (2006.01)
*G06F 11/14* (2006.01)

(52) U.S. Cl.
CPC ............ *G06F 3/067* (2013.01); *G06F 3/065* (2013.01); *G06F 11/1458* (2013.01)

(58) Field of Classification Search
CPC ....... G06F 3/067; G06F 3/065; G06F 11/1458
USPC ......................................... 711/162
See application file for complete search history.

(56) References Cited

U.S. PATENT DOCUMENTS

2010/0293349 A1\* 11/2010 Lionetti et al. ............... 711/162

\* cited by examiner

*Primary Examiner* — Ann J Lo
*Assistant Examiner* — Eric T Loonan
(74) *Attorney, Agent, or Firm* — Krishnendu Gupta; Robert Kevin Perkins

(57) ABSTRACT

A method, system, and computer program product for identifying the location of a Virtual Machine File System (VMFS) of a Virtual Machine (VM) on one or more LUNs on a storage medium, replicating the one or more LUNs storing the VMFS, and exposing the replicated one or more LUNs.

20 Claims, 15 Drawing Sheets

VIRTUAL MACHINE BACK-UP

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

RELATED APPLICATIONS

This application is related to co-pending U.S. patent application, filed even date, Ser. No. 13/174,341 entitled "ESTABLISHING A MAPPING TO A VIRTUAL DISK," which is hereby incorporated by reference in its entirety. This application is related to co-pending U.S. patent application, filed even date, Ser. No. 13/174,326 entitled "VIRTUAL MACHINE DATA RECOVERY," which is hereby incorporated by reference in its entirety.

TECHNICAL FIELD

This invention relates to virtual machines.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Virtual processing such as VMware is another known area that offers advantages in data processing, including in the area of apparent configuration to a user. It would be advancement in both the virtual processing and data storage arts to exploit better the respective individual capabilities for reaping more and better benefits for users in the respective fields.

SUMMARY

A method, system, and computer program product for identifying the location of a Virtual Machine File System (VMFS) of a Virtual Machine (VM) on one or more LUNs on a storage medium, replicating the one or more LUNs storing the VMFS, and exposing the replicated one or more LUNs.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
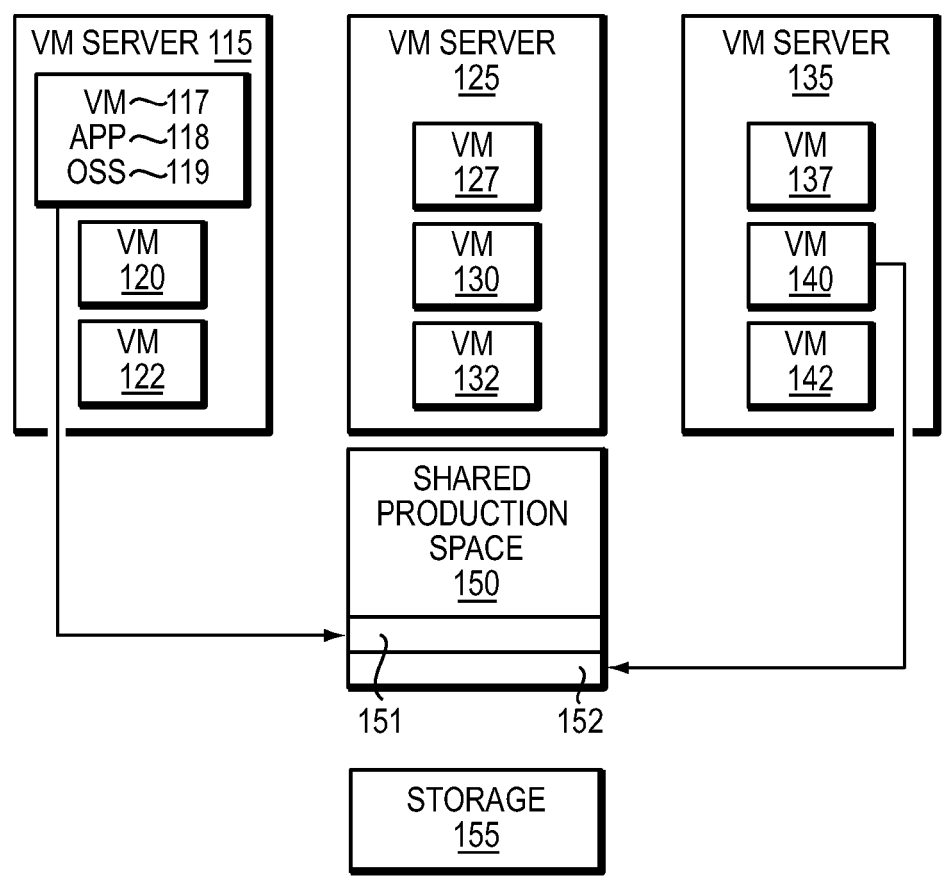
FIG. 1 is a simplified illustration of VM servers and a shared production space, in accordance with an embodiment of the present disclosure.

In an embodiment, the current disclosure may enable back-up and recovery tools for a virtual machine. In some embodiments, the current disclosure may enable Full Virtual Machine and Independent File Level Backup and Recovery. In other embodiments, back-up and recovery may be enabled from hardware or software based snapshot replicas where VM data is stored. In further embodiments, Hardware or software Based snapshot technology may be used to enable back-up or recovery. In still other embodiments, VMware VCB Tools may be used to enable back-up or recovery.

In certain embodiments, the hard drive image presented to a Virtual Machine (VM) may be identified on the storage device which stores the VM drive image or Virtual Machine File System (VMFS). In some embodiments the VM drive image may be cloned on the storage device. In certain embodiments, the clone of the VM image may be presented to another VM on a different VM server. In at least some embodiments, the different VM server may not be actively receiving IO data. In further embodiments, the other VM server may create a back-up of the clone of the VM image. In alternative embodiments, the clone may be accessed through the standard VM server tools.

Conventionally, use of virtual machine technology, for example as provided by VMWare or Citrix, includes a combination of traditional backup software (e.g. EMC Avamar, Networker, Symantec Netbackup) and or vStorage API toolkit to back up the Virtual machine and File System and application data residing on these virtual Machines. Generally, this method of back involves backup clients reading the data from the production Storage LUNs. Generally, an ESX, VM server, or hypervisor, used interchangeable herein, may be software that runs one or more virtual machines (VM). As used herein, the term storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image.

Typically, a vStorage API based backup sequence consists of 6 parts. Usually, the snapshot production of the VM may be stopped and the VM may be quiesced using vmware snapshot. Generally the VM may be unquiesced (if quiesced). Usually, using vStorage API, the VMDK is exported or mounted (for the individual VM's). Conventionally, the backup will be run and the VMDK will be un-mounted. Usually, the snapshot will be removed. Generally, the VM is paused, a snapshot of the VM is taken, and then a backup of the snapshot is made.

The backup generally resides on the host where VDDK toolkit is installed, which may be referred to herein as a proxy host. Typically, the VDDK toolkit provides two ways to export/mount the VM Disk images (i.e. VMDK) to the proxy host. Traditionally to export or mount the virtual disk images, (i.e. VMDK) the virtual disk images are exported or mounted over Network or the virtual disk images are mounted or exported from the Shared Storage Area Network (SAN) LUNs (i.e. SAN).

Traditionally while performing the backup and exporting or mounting the virtual disk images to the proxy host, all the IO that occur during the back-up are not sent to the disk but queued. Generally, the IOs that occur during the back-up may be redirected to the SAN LUN's on which the production VMFS is created. Conventionally, while the load on the production ESX may be reduced in terms of CPU resources as the backup job is offloaded to the proxy host, this usually has an impact on the production ESX Servers I/O. Typically, while the exports of the virtual disks (read's from the mount point) are taking place, actual read and writes occur from the Shared production Storage. Usually, at the end of the backup when the snapshot is deleted, a merge of redo log file is performed, i.e. writing back the IOs which occurred during the back-up. Traditionally, the writing back may have an unwanted impact on the performance depending of amount of data being written to redo log file (e.g. for a busy database system, redo log file may grow to a large size quickly).

Virtual machine technology, including the ESX server is described in U.S. Pat. No. 6,397,242 to Devine et. al, issued May 28, 2002 and assigned to VMware, a majority owned subsidiary of EMC Corporation, the assignee of the present invention. This '242 patent is hereby incorporated in its entirety by this reference. The virtual machine technology interacting with a data storage environment is described in U.S. Pat. No. 7,552,279 to Mark Gandler issued Jun. 23, 2009 and assigned to EMC Corporation, the assignee of the present invention. This '279 patent is hereby incorporated in its entirety by this reference. Consequently, the following discussion makes only general references to the operation of such virtual machine technology.

Refer now to the example embodiment of FIG. 1. In the embodiment of FIG. 1, there are multiple VM servers 115, 125, 135. Note, as used in this disclosure, a VM server may be a generic hypervisor or a vendor specific type of hypervisor. Each VM server runs one or more virtual machines such as VM 117, 120, and 122. Each virtual machine, such as 117, may have an application space 118 and an OS space 119. The virtual machines in FIG. 1 have a shared production space 150 and this shared production space is stored on storage 155.

Figure 2:
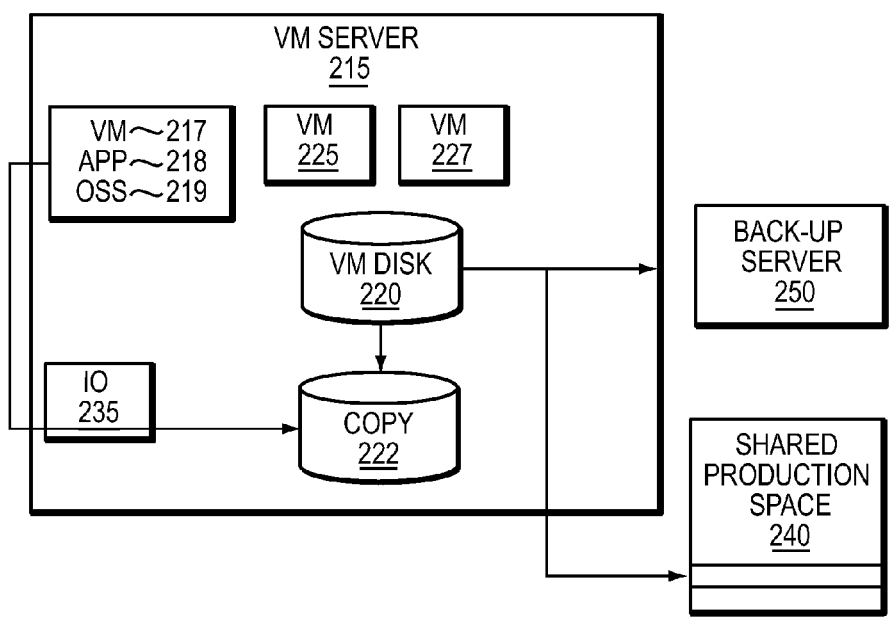
FIG. 2 is a simplified illustration of a VM server, a shared production space, and a back-up server, in accordance with an embodiment of the present disclosure.
Figure 3:
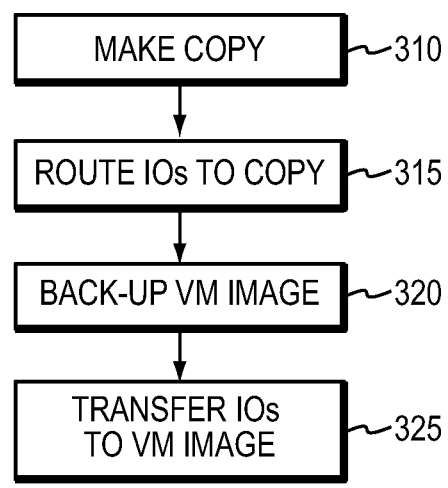
FIG. 3 is a simplified method for backing up a VM image, in accordance with an embodiment of the present disclosure.

Refer now to the example embodiments of FIGS. 2 and 3. To back up a VM disk for a VM, such as VM disk 220, VM server 215 makes a copy 222 of disk 220 (step 310). Incoming IO 235 may be routed to copy 222 (step 315) while VM Disk 220 is backed up (step 325).

Figure 4:
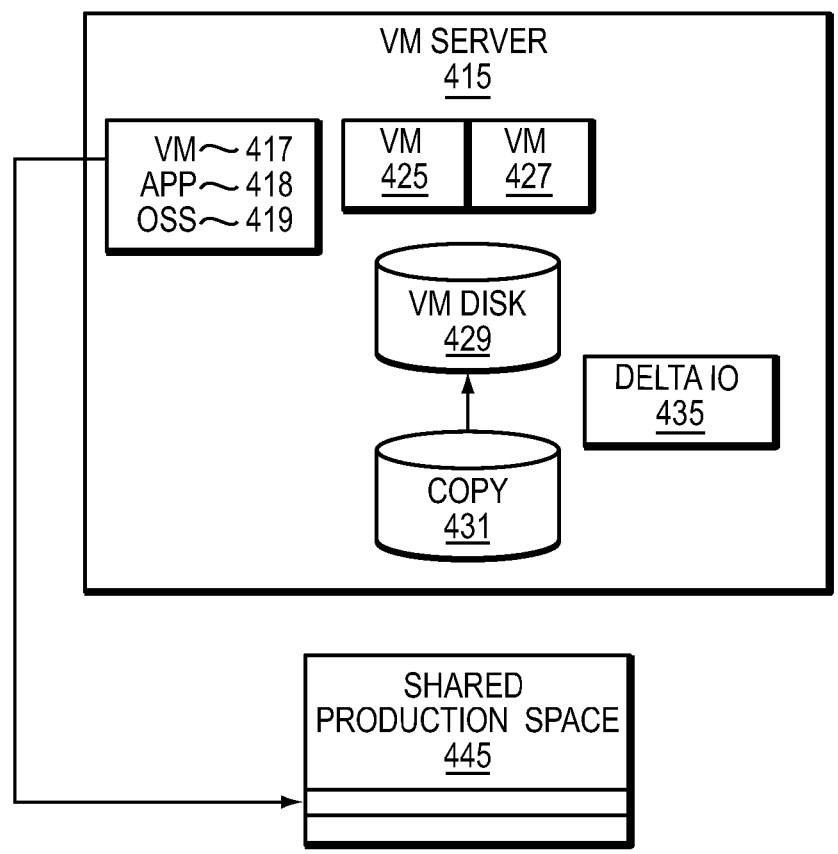
FIG. 4 is a simplified illustration of a VM server, a shared production space, and copy of a VM disk, in accordance with an embodiment of the present disclosure.

Refer now to the example embodiments of FIGS. 3 and 4. Once the back-up is complete, Delta IOs 435, IOs that were written to copy 431 while VM Disk 429 is backed-up, may be written to the VM Disk 429 (step 325).

Figure 5:
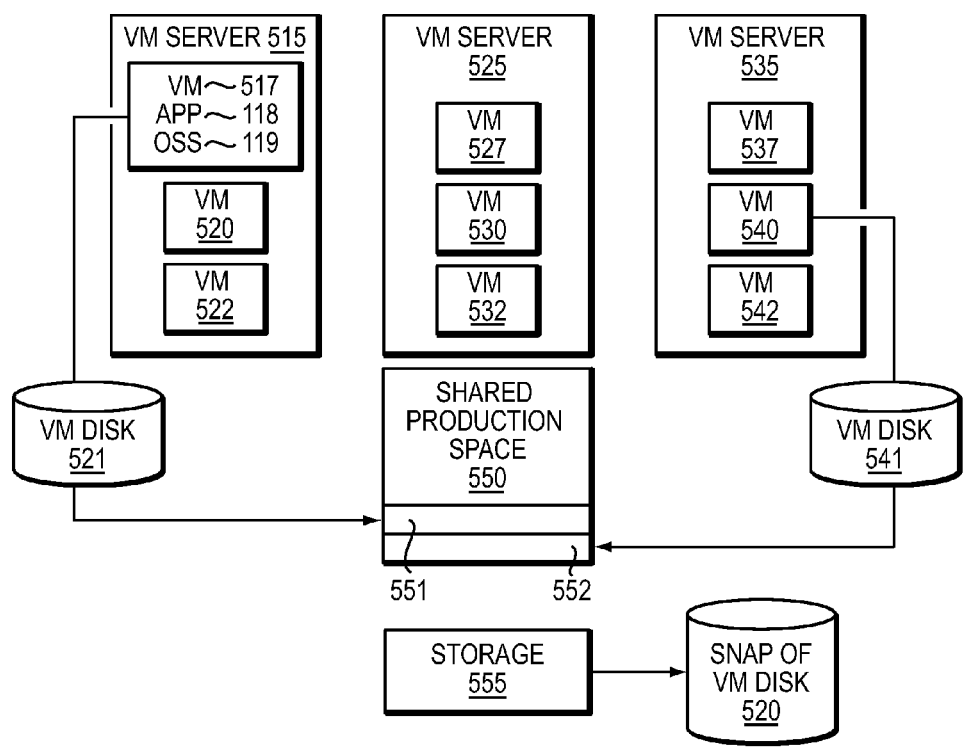
FIG. 5 is a simplified illustration of VM servers, a shared production space, and a snap of a VM disk, in accordance with an embodiment of the present disclosure.
Figure 6:
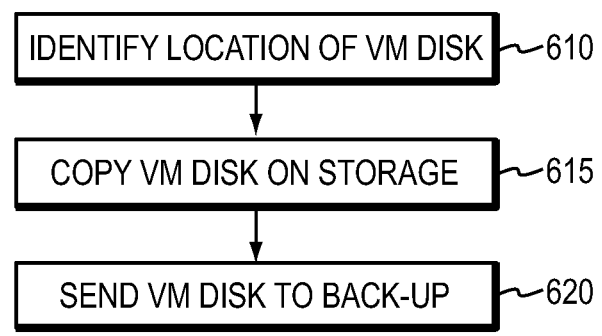
FIG. 6 is a simplified method for backing up a VM image, in accordance with an embodiment of the present disclosure.
Figure 7:
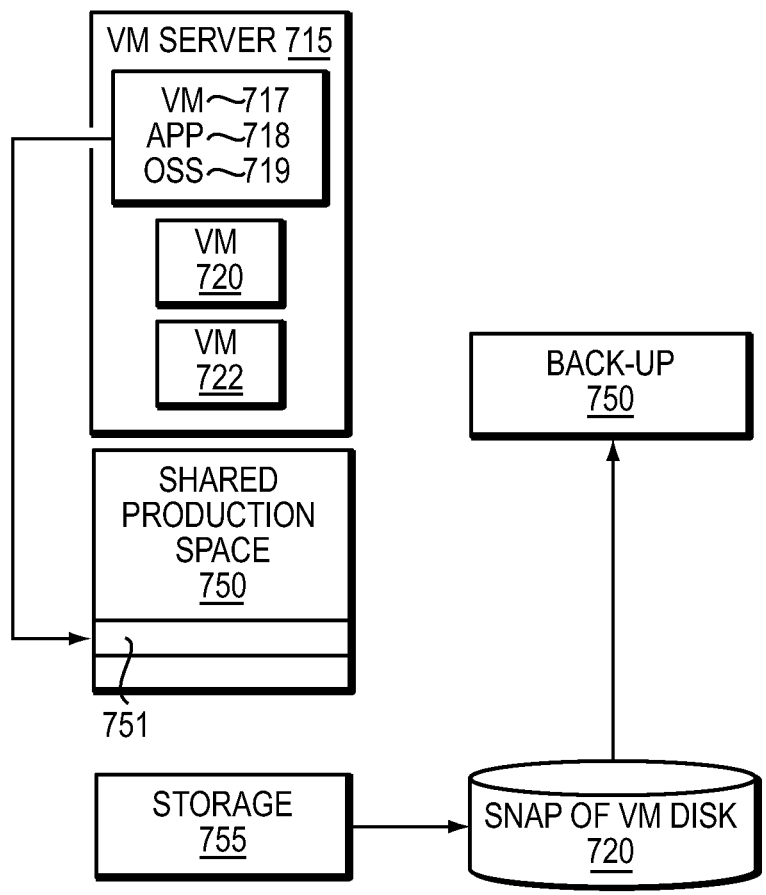
FIG. 7 is a simplified illustration of a VM server, a shared production space, a snap of a VM disk, and a back-up server, in accordance with an embodiment of the present disclosure.

Refer now to the example embodiments of FIGS. 5 and 6. In FIGS. 5 and 6, VM Server 515 may run VMs, such as VMs 517, 520, and 522. Each VM, such as VM 517 may have an application space 118 and an OSS space 119. Each VM may also have a disk image presented to it, where the disk image, such as disk image 521 stored as disk image 551 for VM 517 on shared production space 550. As well, VM 540 may have VM disk 541 stored as disk image 552 on shared production space 550. The shared production space 550 may be stored on storage 555. The corresponding portion 551 of the shared production space 550 for VM disk 521 for VM 517 may be identified (step 610). In some embodiments, the VM may be quiesced. Referring now to FIGS. 6 and 7, storage 755, through hardware or software means, may take a snapshot. Snap 720, of the portion of the storage corresponding to VM disk 521 (step 615). The snapshot 720 corresponding to VM disk 521 may be send to back-up 750 be backed up (step 620).

Figure 8:
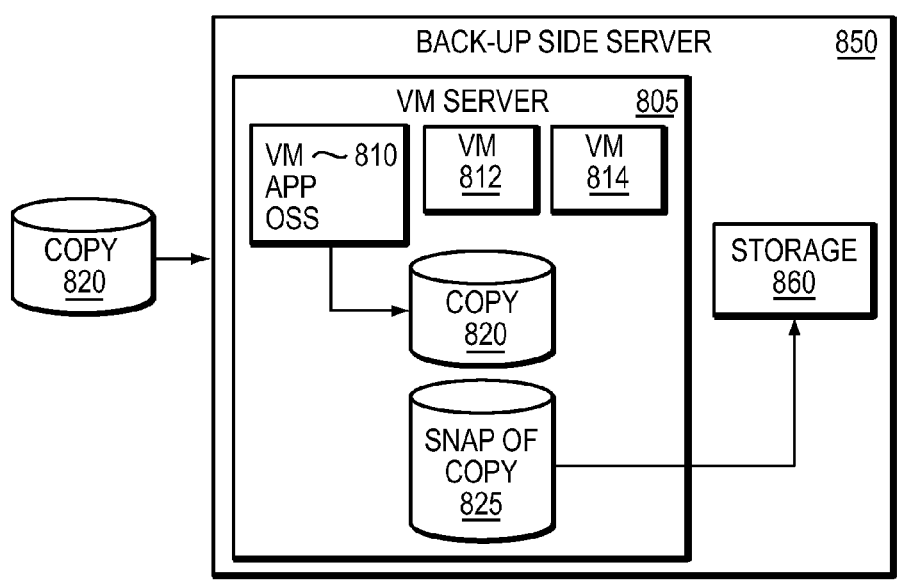
FIG. 8 is a simplified illustration of a back-up side VM server, a copy disk, and storage, in accordance with an embodiment of the present disclosure.
Figure 9:
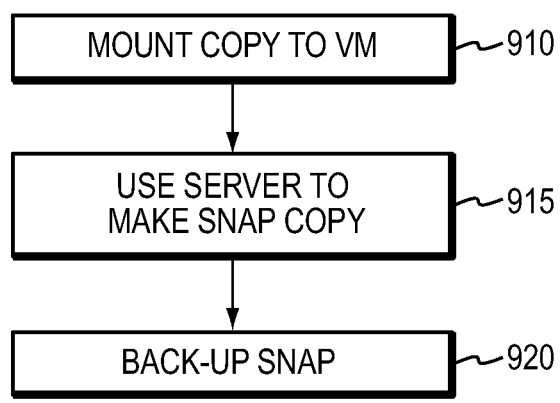
FIG. 9 is an alternative simplified method for backing up a VM image, in accordance with an embodiment of the present disclosure.

Refer now to the example embodiments of FIGS. 8 and 9. In these embodiments, the copy of the VM disk may be sent to back-up 850. Back-up 850 may have a VM server 805. VM server 805 may mount the back-up copy of the VM Disk to the VM 810 (step 910). VM server 805 may make a snap copy, SNAP 725, of the mounted copy of VM disk 820 (step 915). A copy of SNAP 725 may be backed-up to storage 860 (step 920).

Figure 10:
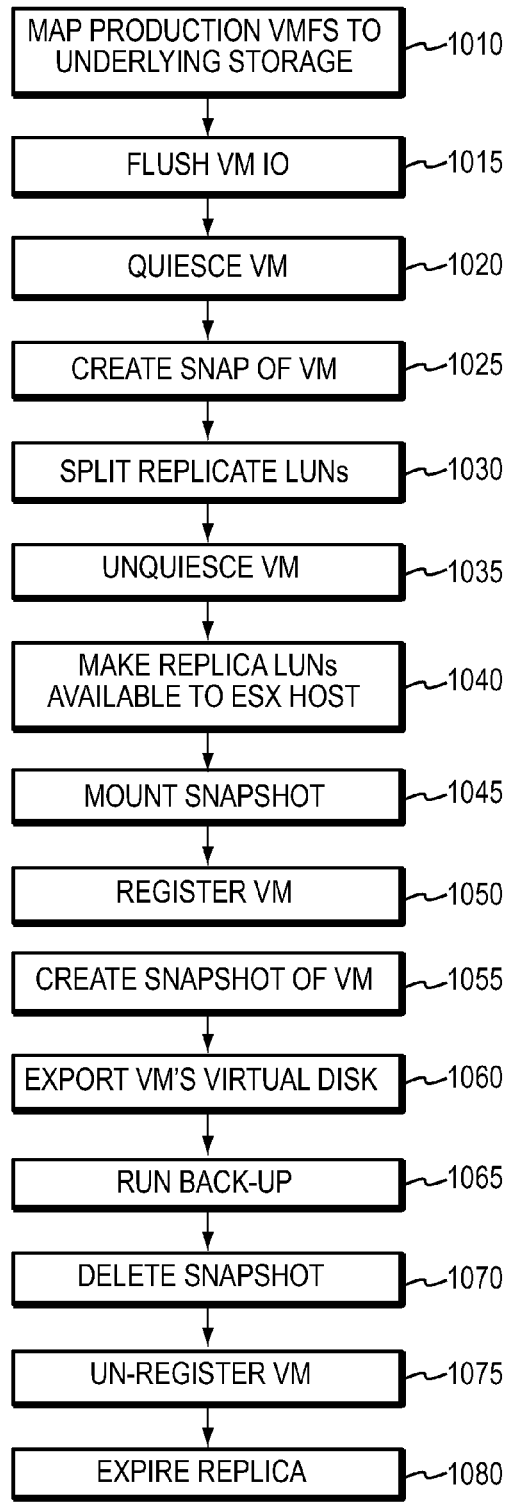
FIG. 10 is a further alternative simplified method for backing up a VM image, in accordance with an embodiment of the present disclosure.

Generally, a VMW environment may have commands specific to the VMW ESX server. Refer now to the example embodiments of FIGS. 10 and 11. The production Virtual Machine File System (VMFS) 1121 of VM 1117 is mapped to the underlying Storage Details 1115 (step 1010). In some embodiments, this may include finding the details about the underlying production storage on which the VMFS is created. In certain embodiments, this may be performed using the Vmware Provided VI SDK. Storage 1115 may use SAN based snapshot technology (i.e Hardware or software based storage snapshot) to Start the Clone/snap operation of the production LUNS 1120 on which the VMFS is stored to create Replica LUNS 1160 or Replica VMFS 1160 (step 1030). VM may be flushed (Step 1115) VM 1117 may be quiesced (step 1020). Snapshot may be created of the VMFS (step 1025). Note, that in other embodiments, the steps 1014, 1020 and 1025 may be performed in a single step by the VM software tools. The replica LUNs 1160 may be split so they may be accessed by the VM server 1115 for read/write IO (step 1030). VM 1117 may be unquiesced (step 1035).

Replica LUNs 1160 may be made visible to non-active esx server 1165 (step 1040). The esx host 1165 may mount the VM snapshot 1171 from replica LUN 1160 (step 1045). In some embodiments, the replica LUNS may be visible to the Proxy host as PhysicalDevice. The Virtual machine 1167 is registered with ESX server 1165 (step 1050). VMWare snapshot 1181 of the VMFS 1171 is created by ESX Server 1165 (step 1055). Using VDDK toolkit of ESX 1165, Virtual Disks 1171 e.g. VMDK's or Mount the Virtual Machine File System's ((Visible inside the Virtual Machine) may be exported from the Replica LUNs 1160 to a point on the proxy host or back-up client 1180 (step 1060). In certain embodiments, backup client may read the VMDK image data directly from the snapshot LUN using VDDK API's without exporting/mounting the VMDK image file. The backup is run (step 1065). The exported Virtual Disks 1171 are deleted or unmounted (step 1070). The virtual machine 1165 is unregistered from the ESX Server 1165 (1075). The replicated VMFS is expired (1080)

Figure 11:
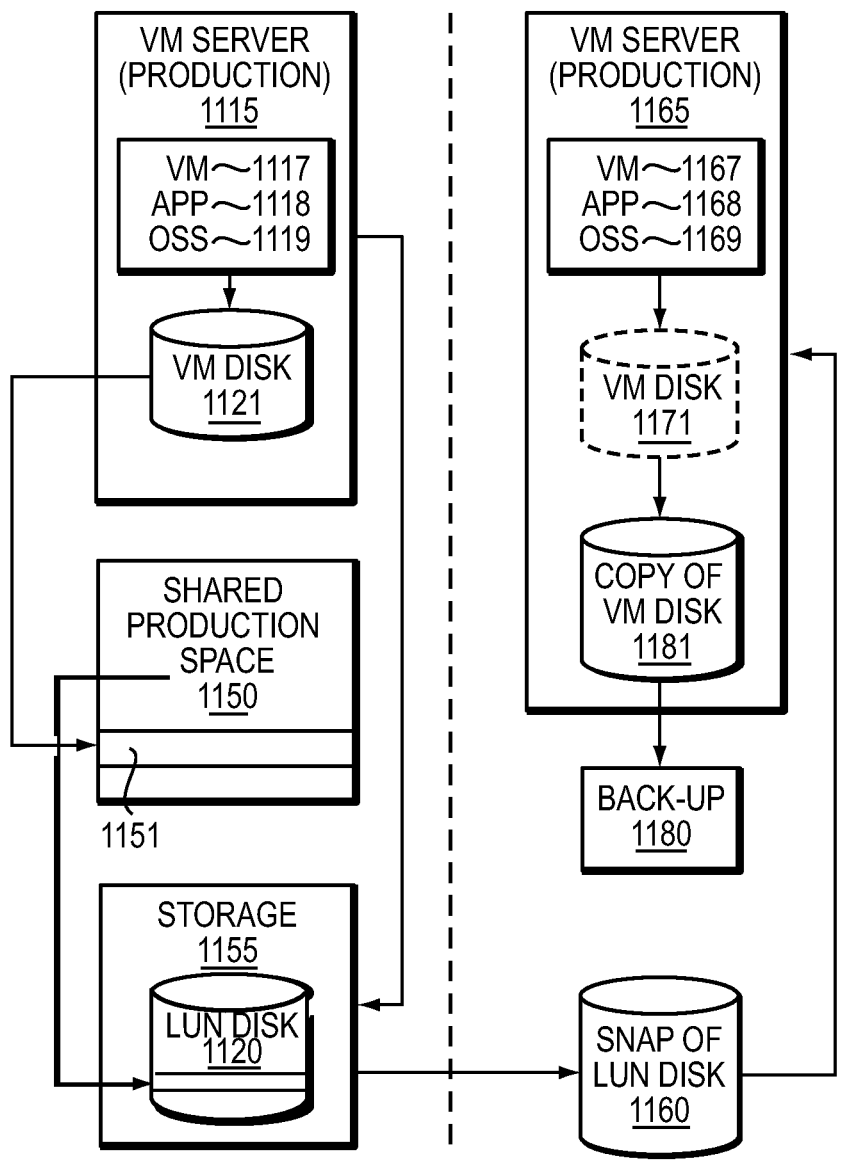
FIG. 11 is a simplified illustration of a VM server, shared production space, and back-up side VM server, in accordance with an embodiment of the present disclosure.
Figure 12:
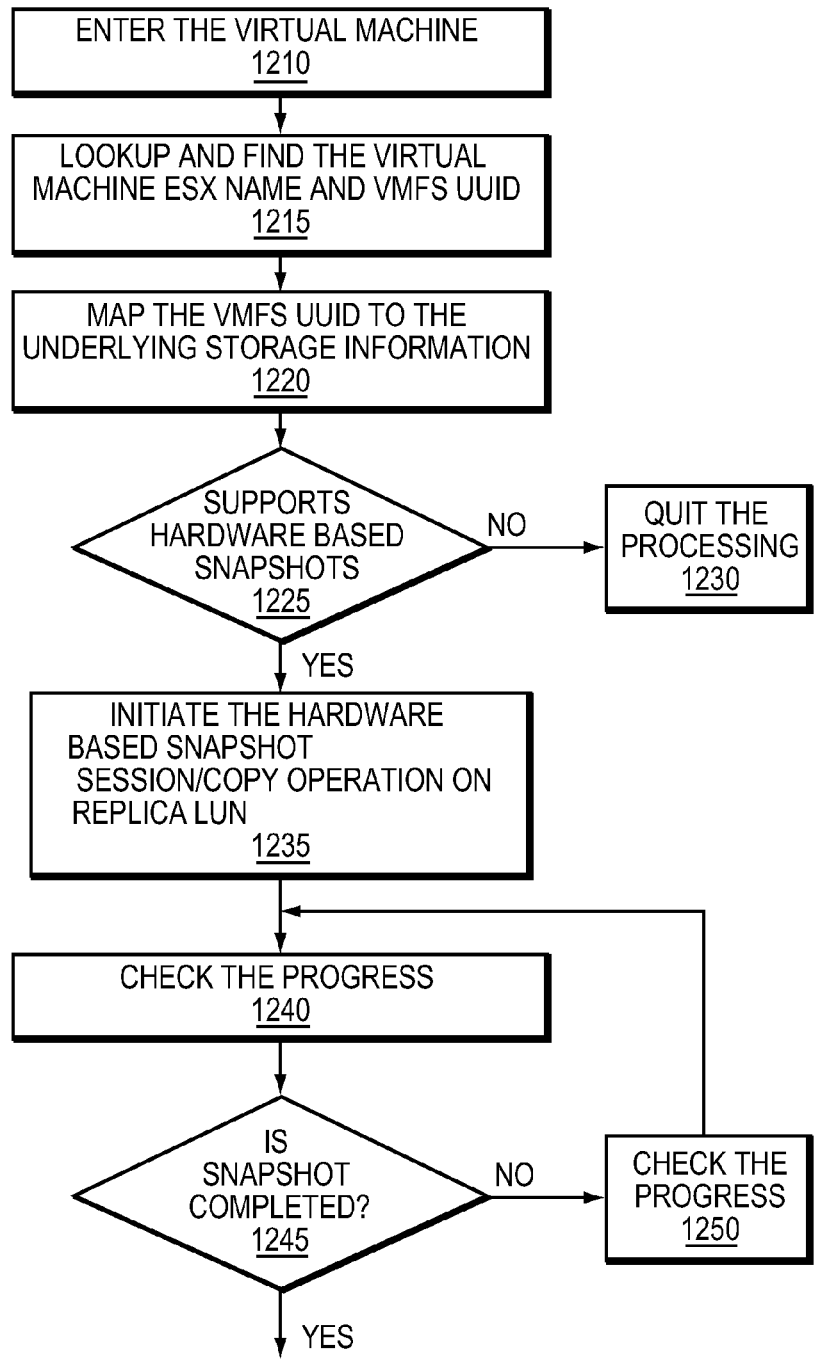
FIGS. 12 and 13 are an alternative simplified method for backing up a VM image with an ESX server, in accordance with an embodiment of the present disclosure.

Refer now to the example embodiments of FIGS. 11 and 12. The name of the Virtual Machine, DNS Name, or IP Address is entered (step 1210). Using the VI SDK, a look-up is performed to find the Virtual machine ESX Name and VMFS uuid on which Virtual Machine OS and APP Data resides (step 1215). The VMFS uuid is mapped to the Underlying Storage Information (step 1220). A determination is made if the underlying storage supports snapshots (step 1225). If the storage does not support snapshots processing is ended (step 1230). For All the SAN LUN's which make up the VMFS (Production VMFS LUN's), a snapshot session/copy operation is executed to create replica LUN's (replica VMFS) using the tools/CLI provided by Storage Array hardware vendor (step 1235). The progress of the snapshot session is checked (1440). If the snapshot is completed processing continues (step 1245). If the processing is not completed the progress is checked (step 1250).

Figure 13:
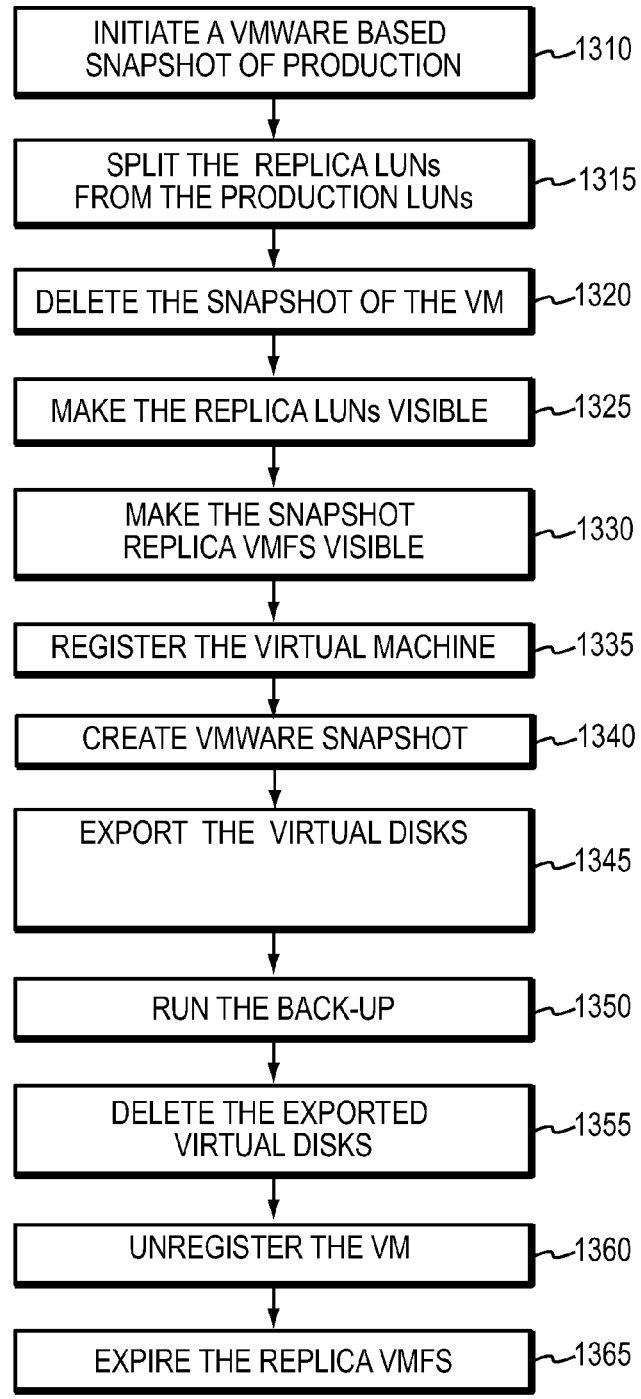

Now refer to the example embodiments of FIGS. 11 and 13. A VMWare based snapshot of the production VM is performed (step 1310). The VM may be quiesced for this operation. The replica LUNS are split from the Production LUNS so the LUNS may be accessed by the VMW server for read/write (I/O) operations (step 1315). The VM is unquiesced if it was quiesced. The snapshot of the VM is deleted (step 1320). The replica LUNs is made visible to ESX host (step 1325) and the VMFS snapshot is mounted and made to a VM in the ESX (step 1330). In some embodiments the snapshot VMFS may appear with name like "snapxxxx-prodVMFSname."

The snapshot replica VMFS (which consists of replica SAN Luns) is made visible to the Proxy host as PhysicalDevices e.g. \\.\PHYSICALDRIVE (step 1330). The virtual machine vmx file's is registered on the snapshot VMFS to the VC inventory (step 1335). In some embodiments this may be done by giving it a name (e.g. prepend it with "snap-" Actual VM name). A VMWare snapshot may be created of these registered VM's (from the snapshot VMFS) (step 1340). Using VDDK toolkit, the Virtual Disks e.g. VMDK's or Mount the Virtual Machine FileSystem's may be exported from the Replica VMFS LUN's to a export directory/Mount point on the VCB proxy host (step 1345). In some embodiments, the backup client may also read the vmdk image data directly from the snapshot LUN using VDDK API's without exporting/mounting the VMDK image file. The back-up software is run to backup the VM's Disk Image or Mounted VM's Filesystem to Tape (dyrp 1350). The Virtual Disks are deleted or unMounted (step 1355). The VMWare snapshots of VM are deleted. The VM is unregistered (Step 1360). The replicated VMFS is expired (step 1365).

Figure 14:
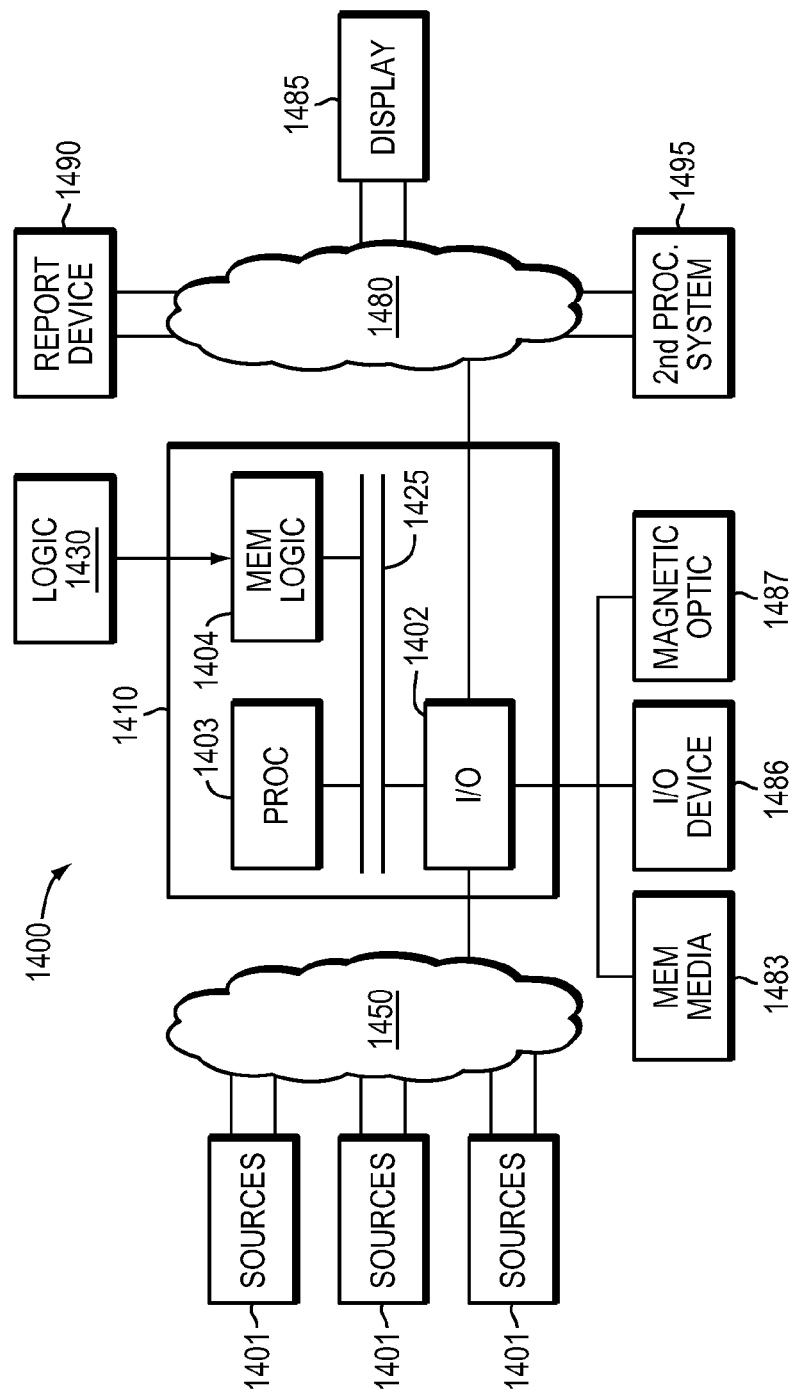
FIG. 14 is an example of an embodiment of an apparatus that may utilize the techniques described herein, in accordance with an embodiment of the present disclosure.
Figure 15:
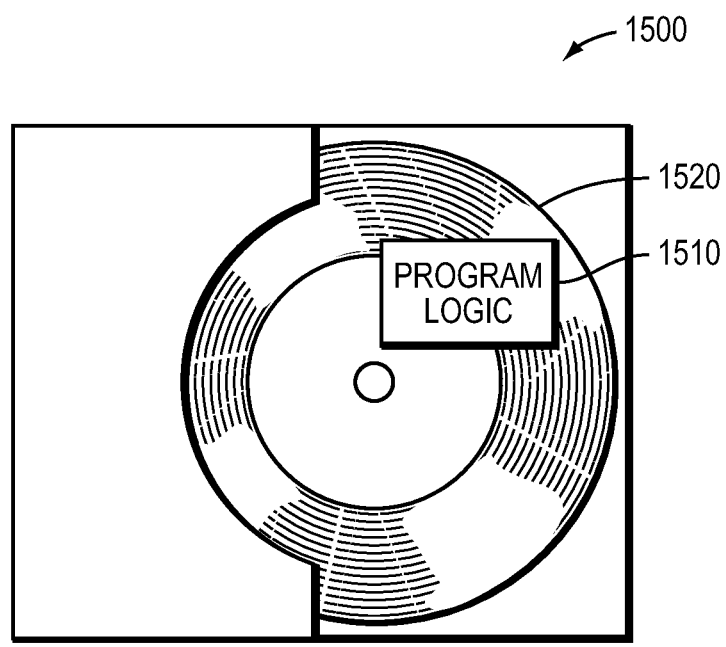
FIG. 15 is an example of an embodiment of a method embodied on a computer readable storage medium that may utilize the techniques described herein, in accordance with an embodiment of the present disclosure.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as being loaded into memory 1404 and executed by processor 1403 of the computer of FIG. 14, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine. FIG. 15 shows Program Logic 1510 embodied on a computer-readable medium 1530 as shown, and wherein the Logic is encoded in computer-executable code configured for carrying out the reservation service process of this invention and thereby forming a Computer Program Product 1500.

The logic for carrying out the method may be embodied as part of the aforementioned system, which is useful for carrying out a method described with reference to embodiments shown in, for example, FIG. 1 and FIG. 2. For purposes of illustrating the present invention, the invention is described as embodied in a specific configuration and using special logical arrangements, but one skilled in the art may appreciate that the device is not limited to the specific configuration but rather only by the claims included with this specification.

Although the foregoing invention has been described in some detail for purposes of clarity of understanding, it may be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. Thus it will be appreciated that, in addition to data replication systems, the optimal journaling policy of the present invention has widespread application to journaling systems including database systems and version control systems.

In the foregoing specification, the invention has been described with reference to specific exemplary embodiments thereof. It may, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A system for data replication, the system comprising:
a virtual server having a virtual machine (VM); the VM communicatively coupled to a virtual machine file system (VMFS);
a non-transitory first storage medium comprising one or more logical unit numbers (LUNs), the storage medium storing the virtual machine file system; and
computer-executable logic operating in memory, wherein the computer-executable program logic is configured for execution of:
identifying a location of the VMFS on the one or more LUNs;
replicating the one or more LUNs storing the VMFS to create a replica of the one or more LUNs;
exposing the replica of the one or more LUNs; and
backing-up at least some data on the replica of one or more LUNs.

2. The system of claim 1, the system further comprising a second virtual server and wherein the replica of the one or more LUNs are exposed to the second virtual server; and wherein the backing-up comprises taking a snapshot, by the second virtual server, of the VMFS on the replica of the one or more LUNs.

3. The system of claim 2, wherein the computer-executable program logic is configured for execution of:
quiescing the VM before replicating the one or more LUNs.

4. The system of claim 2, wherein the computer-executable program logic is configured for execution of:
mounting the replica of the one or more LUNs on the second virtual server.

5. The system of claim 2, wherein the computer-executable program logic is configured for execution of:
registering the VM of the one or more LUNs on the second virtual server.

6. The system of claim 2, wherein the computer-executable program logic is configured for execution of:
expiring the replica of the one or more LUNs after the backing-up; and
exporting the snapshot of the VMFS from the second virtual server.

7. The system of claim 1 wherein the backup-up further comprises using a second virtual server to copy data from the replica to an export directory.

8. A computer program product for use in replication for comprising:
a non-transitory computer readable medium encoded with computer executable program code for using read signatures in replication, the code configured to enable an execution of:
identifying a location of a virtual machine file system (VMFS) of a virtual machine (VM) on one or more logical unit numbers (LUNs) on a storage medium;
replicating the one or more LUNs storing the VMFS to create a replica of the one or more LUNs;
exposing the replica of the one or more LUNs; and
backing-up at least some data on the replica of the one or more LUNs.

9. The computer program product of claim 8, the code further configured to enable the execution of:
exposing the replica of the one or more LUNs to a second virtual server;
and wherein the backing-up comprises taking a snapshot, by the second virtual server, of the VMFS on the replica of the one or more LUNs.

10. The computer program product of claim 9, the code further configured to enable the execution of:
quiescing the VM before replicating the one or more LUNs.

11. The computer program product of claim 9, the code further configured to enable the execution of:
mounting the replica of the one or more LUNs on the second virtual server.

12. The computer program product of claim 11, the code further configured to enable the execution of:
expiring the replica of the one or more LUNs after the backing-up; and
exporting the snapshot of the VMFS from the second virtual server.

13. The computer program product of claim 9, the code further configured to enable the execution of:
registering the VM of the one or more LUNs on the second virtual server.

14. The computer program product of claim 8 wherein the backup-up further comprises using a second virtual server to copy data from the replica to an export directory.

15. A computer implemented method for use data replication, the method comprising:
identifying a location of a virtual machine file system (VMFS) of a virtual machine (VM) on one or more logical unit numbers (LUNs) on a storage medium;
replicating the one or more LUNs storing the VMFS to create a replica of the one or more LUNs;
exposing the replica of the one or more LUNs; and
backing-up at least some data on the replica of the one or more LUNs.

16. The computer implemented method of claim 15, the method further comprising:
exposing the replica of the one or more LUNs to a second virtual server;
and wherein the backing-up comprises taking a snapshot, by the second virtual server, of the VMFS on the replica of the one or more LUNs.

17. The computer implemented method of claim 16, the method further comprising:
mounting the replica of the one or more LUNs on the second virtual server.

18. The computer implemented method of claim 15, the method further comprising:
quiescing the VM before replicating the one or more LUNs.

19. The computer implemented method of claim 15, the method further comprising:
registering the VM of the one or more LUNs on the second virtual server; and
exporting the snapshot of the VMFS from the second virtual server.

20. The computer implemented method of claim 15 wherein the backup-up further comprises using a second virtual server to copy data from the replica to an export directory.

* * * * *